United States Patent [19]
Glover

[11] Patent Number: 4,865,547
[45] Date of Patent: Sep. 12, 1989

[54] SKETCHING DEVICE

[76] Inventor: Henry Glover, 1071 Celestial St., Cincinnati, Ohio 45202

[21] Appl. No.: 187,056

[22] Filed: Apr. 27, 1988

[51] Int. Cl.$^4$ ............................................. G09B 11/04
[52] U.S. Cl. ......................................... 434/85; 434/90
[58] Field of Search ....................... 434/85, 90, 88, 89, 434/91, 92

[56] References Cited

U.S. PATENT DOCUMENTS

| | | | |
|---|---|---|---|
| 3,086,296 | 4/1965 | Bergstrom | 434/91 |
| 3,660,903 | 5/1972 | Caperton, Jr. | 434/90 |
| 4,439,159 | 3/1984 | Hunter | 434/85 |
| 4,611,994 | 9/1986 | Glover | 434/85 |

FOREIGN PATENT DOCUMENTS 335064 of 1930 United Kingdom ................. 434/90

Primary Examiner—Edward M. Coven
Assistant Examiner—Valerie Szczepanik
Attorney, Agent, or Firm—Wood, Herron & Evans

[57] ABSTRACT

An artist's sketching device wherein a sketch pad is bound to a back which presents a viewing window positioned adjacent the pad. A transparent sheet secured to the back has an upper portion over-laying the window, and a lower portion which is liftable so that pages of the pad can be placed beneath it and any single page upon it. Upper proportioning lines displayed in the upper portion of the sheet define sections of the window. Lower proportioning lines on the lower portion of the sheet are discernible through a page residing thereover to define areas of the page which correspond to proportionally similar sections of the window.

12 Claims, 2 Drawing Sheets

SKETCHING DEVICE

FIELD OF THE INVENTION

This invention relates to an improved combination artist's sketching pad and viewing device.

BACKGROUND OF THE INVENTION

It is known to provide artist's viewers presenting a frame or window which, when a scene to be drawn is viewed through it, assists the artist in drawing that scene. Such devices are shown in the U.S. patents to Newlands, U.S. Pat. No. 1,646,868; Austin U.S. Pat. No. 2,418,286; and Bergstrom U.S. Pat. No. 3,086,296. However, those devices are relatively complex, expensive and hard to use, especially for beginning artists. Moreover, they are not sized to fit in the pocket and require a table or easel to support the sketch pad.

Applicant's U.S. Pat. No. 4,611,994, the disclosure of which is expressly incorporated herein by reference, shows an artist's sketching device in which a sketch pad is mounted on a lower portion of a rigid back, with a window formed within an upper portion of the back. The height and width of the window are in the same approximate proportion to one another as the corresponding dimensions of the pages of the sketch pad. By positioning the window proximate to and in the same plane as the pad, an artist is better able to accurately translate the scene viewed through the window onto the paper.

It is an object of this invention to further facilitate an artist in accurately sketching a scene that is in view.

It is still another object of this invention to provide an improved combination viewing device and sketching pad.

SUMMARY OF THE INVENTION

To these ends, an improved sketching device comprises a back having a pad of bound pages secured to a bottom (adjacent) part thereof, a window formed in another or top part thereof, a transparent sheet secured to the top part so as to be liftable from the bottom part in order to place any single page thereover and proportioning or grid lines displayed both in upper and lower portions of the sheet. The upper grid lines define sections of the window, and the lower grid lines correspond to proportionally similarly shaped areas of the lower portion of the sheet. The lower grid lines are heavy or dark enough to be discernible through a page of the pad which overlays the lower portion of the sheet.

Preferably, two upper grid lines form a cross, to define four approximately equal rectangular sections in the window, and two lower grid lines form a cross to define four areas of the lower portion which correspond proportionally to the window sections. The pages are bound on one side edge thereof, preferably by a wire retainer, thereby to enable other pages and the front cover to be hinged and folded against a rear surface of the back.

In use, the page to be sketched upon is placed over the lower portion of the transparent sheet. The lower grid lines are discernible through the page to define areas which correspond to proportionately similar sections defined by the upper grid lines. By viewing a scene through the window, with the viewed scene divided into separate sections by the upper grid lines, and simultaneously sketching in the proportionally corresponding areas of the page, as defined by the lower grid lines, an artist is better able to sketch a proportionately accurate representation of the scene that is in view.

Thus, according to a feature of the invention, proportionately similar upper and lower grid lines enable an artist to sketch upon a page a scene that is proportionately accurate with respect to a scene that is in view.

Other objects and advantages of the invention will become apparent upon reading the following detailed description and upon reference to the drawings, in which:

DETAILED DESCRIPTION OF A PREFERRED EMBODIMENT

Figure 1:
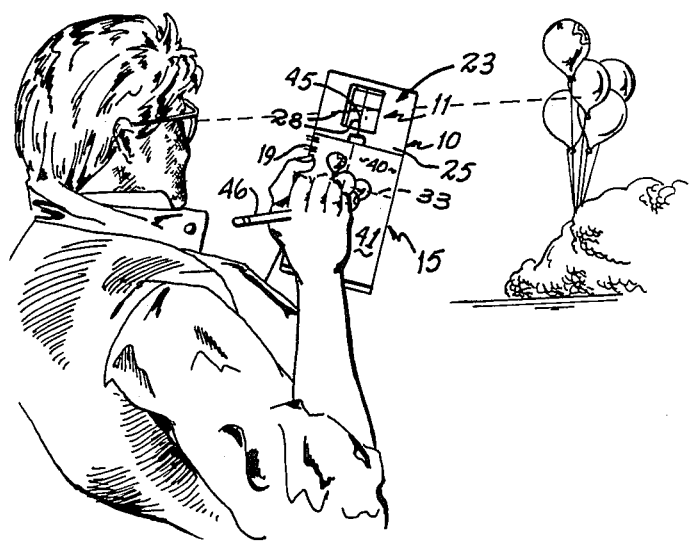
FIG. 1 is a perspective view illustrating the preferred embodiment of the invention in use.
Figure 2:
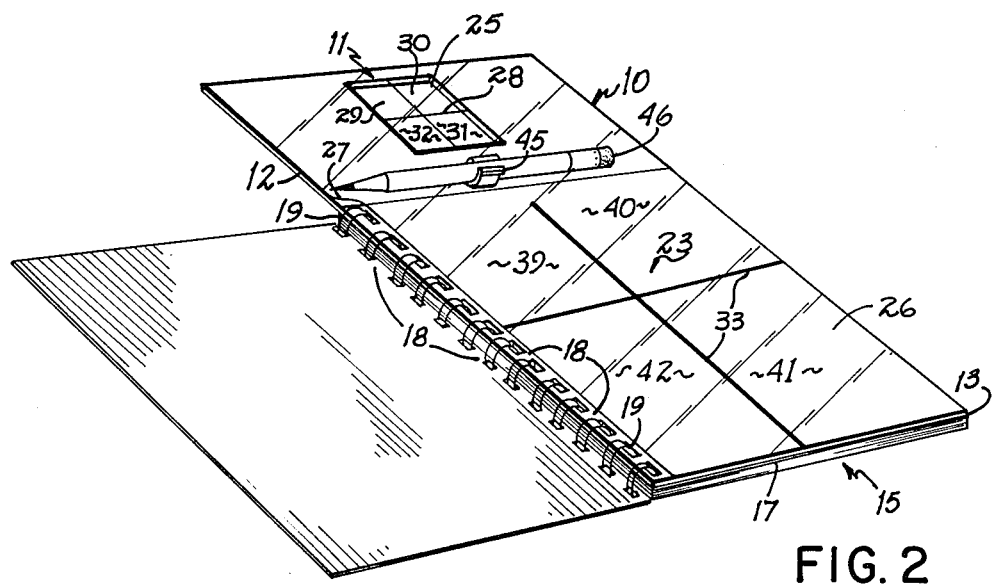
FIG. 2 is a perspective view of a preferred embodiment of the invention, with the lower portion of the sheet positioned over the bottom part of the back, with some sheets residing therebetween, and a page to be sketched upon extending to a side of the pad.

In preferred form, the sketching device of this invention includes a rigid rectangular base or back 10, which may be formed of double thickness cardboard. A rectangular viewing window 11 is centered in a top part 12 of the back 10. This window has a height h and a width w.

Mounted to the adjacent or bottom part 13 of the back 10 is a sketch book 15 comprising a series of pages and a cover 17. The pages and cover are bound together and to the back 10 along the left edge 18. The binder may be a continuous spiral wire binder 19 as shown, or alternatively it may be a flexible, expansible plastic binder. The top cover 17 is of cardboard and is preferably sufficiently rigid that when open, the cover will support the left hand pages while the back 10 supports the right hand pages.

The individual pages of the pad are of height H and width W. Preferably, the ratio H/W of the pad is approximately the same as the ratio h/w for the window. The proportions should be similar but they need not correspond identically. Where, for example, the pages of the pad are 6 inches high and 4 inches wide, the window may be about $2\frac{1}{4}$ inches high by $1\frac{1}{2}$ inches wide (H/W=1.5; h/w=1.5). For this size page, the back 10 can for example be 4 wide by $9\frac{3}{8}$ inches high.

Figure 4:
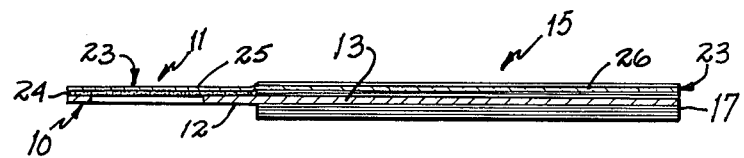
FIG. 4 is a cross sectional view taken along line 4—4 of FIG. 3.

A transparent sheet 23 is secured to the back 10 by a line of adhesive, best shown at 24 of FIG. 4. An upper portion 25 of the sheet substantially overlays the window 11. A lower portion 26 of the sheet resides upon the bottom part 13 of the back 10, but is liftable therefrom to permit any one of the pages to reside singly thereon, with the rest of the right hand pages placed between the sheet 23 and the back 10. (It will be appreciated that, while a single unitary sheet 23 is preferred, with the upper portion 25 over the window and a lower portion 24 overlaying the pad, two physically separate sheets could be used for the same purpose. As used herein, the terms "upper portion" and "lower portion"

are intended to comprehend and include both portions of a single sheet, and separate sheets.) The lower portion 26 is preferably narrower than the upper portion 25 to accommodate the wire retainer 19. The narrowing is provided by a tapered edge 27 of upper portion 25 adjacent the binder 19.

Figure 3:
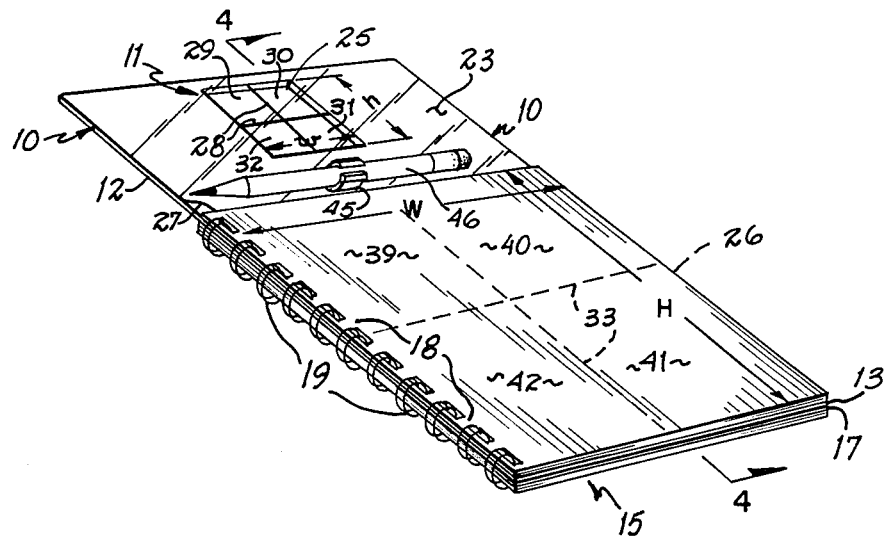
FIG. 3 is a perspective view of a preferred embodiment of the invention similar to FIG. 2 but with a page to be sketched upon residing upon the lower portion of the sheet.

At least one upper proportioning or grid line 28 is displayed on the upper portion 25 of the sheet, thereby to demarcate or define sections of the window. Preferably, two such perpendicular upper grid lines which form a cross are used so as to define four approximately equal rectangular sections 29–32. At least one lower proportioning or grid line 33 is displayed on the lower portion 26 of the sheet 23 to define areas corresponding in shape and proportion to the window sections. Preferably, two lower grid lines define four areas 39–42 which correspond proportionately to window sections 29–32. The lower grid lines 33 are of sufficient thickness and/or darkness to be discernible through at least one page of the pad, as shown in FIG. 3.

To use this sketching device, an artist places a page to be sketched upon directly on the lower portion 26 of the sheet 23, then enabling areas 29–32 to be discerned through the placed page. As the artist holds the back 10 to view a scene through the window 11, the sections 29–32 of the viewed scene can be more easily visualized within corresponding areas 39–42, thus facilitating the artist in rendering a proportionally correct sketch of the scene.

A holder 45 for securing a drawing instrument 46, such as a pen, pencil or the like, is preferably mounted to base 10 above pad 15 and just below window 11. While any type of holder can be used, a short length of expansible, flexible binder can be adhesively secured to the back and provides an effective retainer for the drawing implement. The pen or pencil can be inserted axially down the center of the binder; the binder expands to grip and hold it.

While the above description constitutes a preferred embodiment of the improved viewing device and sketching pad of this invention, it is to be understood that the invention is not limited thereby and that in light of the present disclosure of the invention, various other alternative embodiments will be apparent to a person skilled in the art.

Accordingly, it is to be understood that changes may be made without departing from the scope of the invention as particularly set forth and claimed.

I claim:

1. A artist's sketching device comprising:
    a back having top and bottom parts, said top part having a rectangular viewing window formed therein;
    a pad of bound pages of drawing paper supported on said bottom part and secured thereto along an axis;
    a transparent sheet secured to said back to lie planar thereon, said sheet having an upper portion substantially overlaying said window and a lower portion sized to approximate the size of pages of said pad, said lower portion being liftable from said back along an axis other than that of securement of said pad to permit any page of said pad to reside singly thereon;
    at least one upper proportioning line displayed on said upper portion of said sheet within a region thereof overlaying said window, thereby to demarcate sections of said window; and
    at least one lower proportioning line displaying on said lower portion of said sheet and discernible through a single page placed thereover, the relative position of said at least one lower proportioning line with respect to said page being approximately the same as the relative position of said at least one upper proportioning line with respect to said window, thereby discernibly demarcating corresponding areas of said page approximately proportional in dimension to said sections of said window.

2. A sketching device as in claim 1 wherein said window and said pages have height to width ratios which are approximately equal.

3. A sketching device as in claim 1 wherein said pages are bound along a side edge of said pad.

4. A sketching device as in claim 2 wherein said pages are bound by a wire retainer.

5. A sketching device as in claim 4 wherein said lower portion is narrower than said upper portion to accommodate said wire retainer.

6. A sketching device as in claim 1 wherein said upper portion of said sheet is sized to approximate and overlay said top part of said back.

7. A sketching device as in claim 6 wherein said upper portion of said sheet is secured to said back above said pad.

8. A sketching device as in claim 7 wherein said upper portion is secured to said back by an adhesive disposed therebetween.

9. A sketching device as in claim 1 wherein said sheet is a flexible, bendable plastic.

10. A sketching device as in claim 1 and further comprising:
    a holder for holding a drawing instrument to said back, between said window and said pad.

11. A sketching device as in claim 1 and further comprising:
    two upper proportioning lines and two lower proportioning lines, said upper lines defining an upper cross in said window and said lower lines defining a lower cross in said lower portion of said sheet.

12. A sketching device as in claim 11 wherein said upper cross demarcates four substantially equal rectangular areas and said lower cross demarcates four substantially equal rectangular sections corresponding proportionally in dimension to said four areas.

* * * * *

UNITED STATES PATENT AND TRADEMARK OFFICE
CERTIFICATE OF CORRECTION

PATENT NO. : 4,865,547

DATED : September 12, 1989

INVENTOR(S) : Henry Glover

It is certified that error appears in the above-identified patent and that said Letters Patent is hereby corrected as shown below:

<u>Title Page,</u>
<u>Abstract</u>

Line 4 — "over-laying" should be --overlaying--

Signed and Sealed this

Eighteenth Day of September, 1990

Attest:

HARRY F. MANBECK, JR.

*Attesting Officer*      *Commissioner of Patents and Trademarks*